United States Patent [19]

Slaats et al.

[11] Patent Number: 4,592,590

[45] Date of Patent: Jun. 3, 1986

[54] HYDRAULIC LIFTING MECHANISM FOR A CHAIR OR THE LIKE USING A TWO PHASE WORKING FLUID

[75] Inventors: Mathew A. Slaats; Patrick E. Strange, both of Jasper, Ind.

[73] Assignee: Kimball International, Inc., Jasper, Ind.

[21] Appl. No.: 770,833

[22] Filed: Aug. 29, 1985

Related U.S. Application Data

[63] Continuation-in-part of Ser. No. 668,307, Nov. 5, 1984.

[51] Int. Cl.$^4$ .............................................. A47C 1/02
[52] U.S. Cl. .................................... 297/347; 108/147; 248/404; 297/349
[58] Field of Search ....................... 91/4; 60/593, 586; 108/147; 248/404, 631, 603, 605; 297/DIG. 3, DIG. 10, 347, 349, 339

[56] References Cited

U.S. PATENT DOCUMENTS

| | | |
|---|---|---|
| 1,651,506 | 4/1923 | Berninghaus . |
| 2,490,823 | 12/1949 | Manning ................................ 91/4 |
| 2,906,095 | 9/1959 | Whitehead, Jr. .................. 60/593 X |
| 2,961,033 | 11/1960 | Galbraith ............................ 248/575 |
| 3,005,444 | 10/1961 | Steibel ............................... 60/593 X |
| 3,143,332 | 2/1962 | Watlington . |
| 3,226,931 | 1/1966 | Bauer .................................... 60/593 |
| 3,286,970 | 11/1966 | Nolon ................................... 248/404 |
| 3,381,926 | 10/1966 | Fritz et al. . |
| 3,594,040 | 12/1968 | Monroe . |
| 4,074,887 | 2/1978 | Hale . |
| 4,139,175 | 2/1979 | Bauer . |
| 4,445,671 | 5/1984 | Reuschenbach et al. . |

FOREIGN PATENT DOCUMENTS

| | | |
|---|---|---|
| 783416 | 4/1968 | Canada . |
| 1605927 | 8/1978 | Fed. Rep. of Germany ...... 248/575 |
| 1151262 | 7/1966 | United Kingdom . |

Primary Examiner—James T. McCall
Attorney, Agent, or Firm—Jeffers, Irish & Hoffman

[57] ABSTRACT

A hydraulic lifting mechanism for an article of furniture including a refrigerant containing reservoir. The mechanism includes a flexible bag having a variable volume and fixed volume reservoir including a diaphragm for dividing the reservoir into two chambers. The first chamber contains hydraulic liquid and the second chamber contains a compressed two phase working fluid. The hydraulic liquid may be transferred between the flexible bag and the first chamber. A control valve mechanism is included in the flexible conduit which connects the flexible bag with the first chamber. The mechanism may be used in combination with a chair to provide an adjustable height control for the seat of the chair or in combination with other articles of furniture.

25 Claims, 5 Drawing Figures

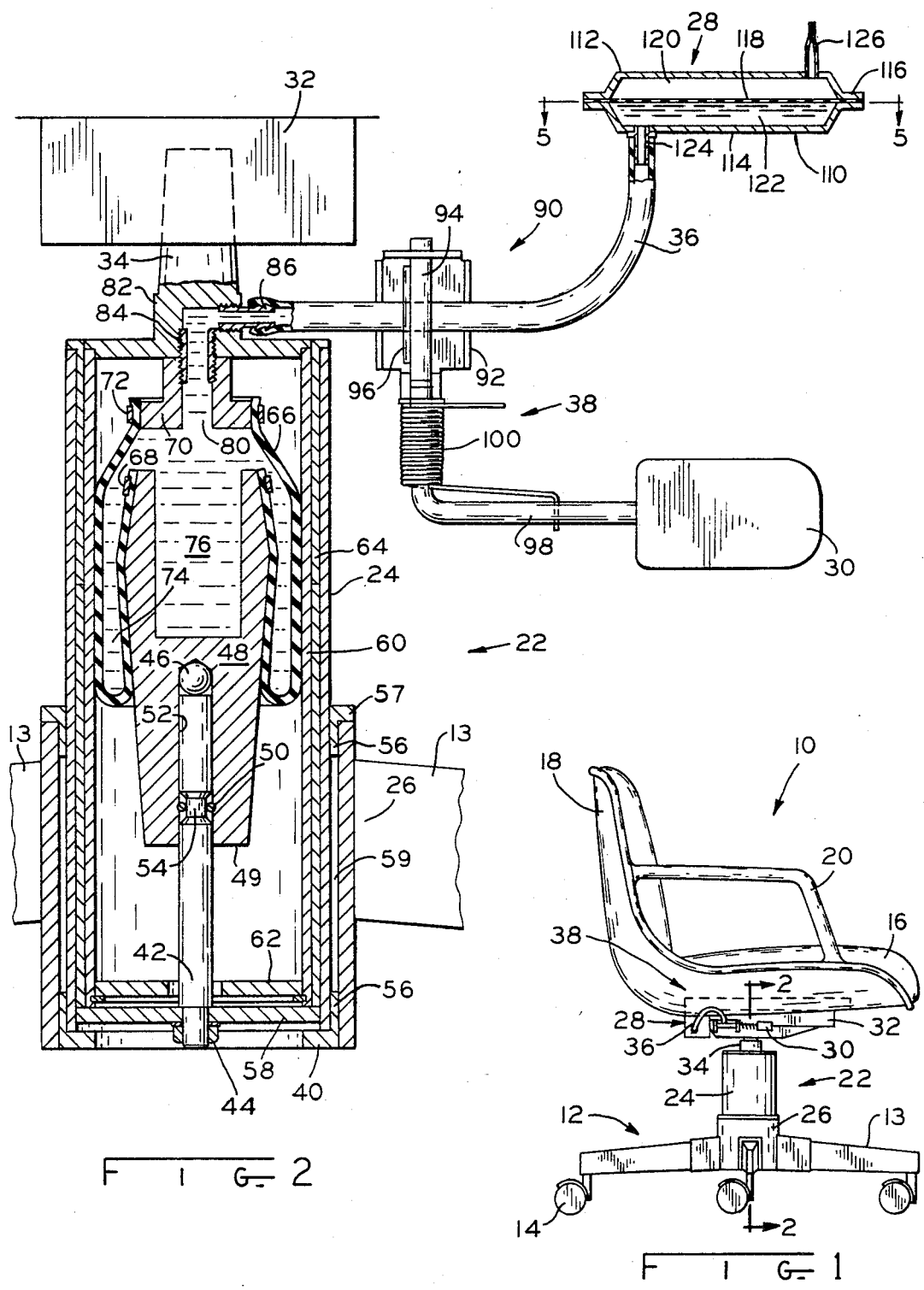

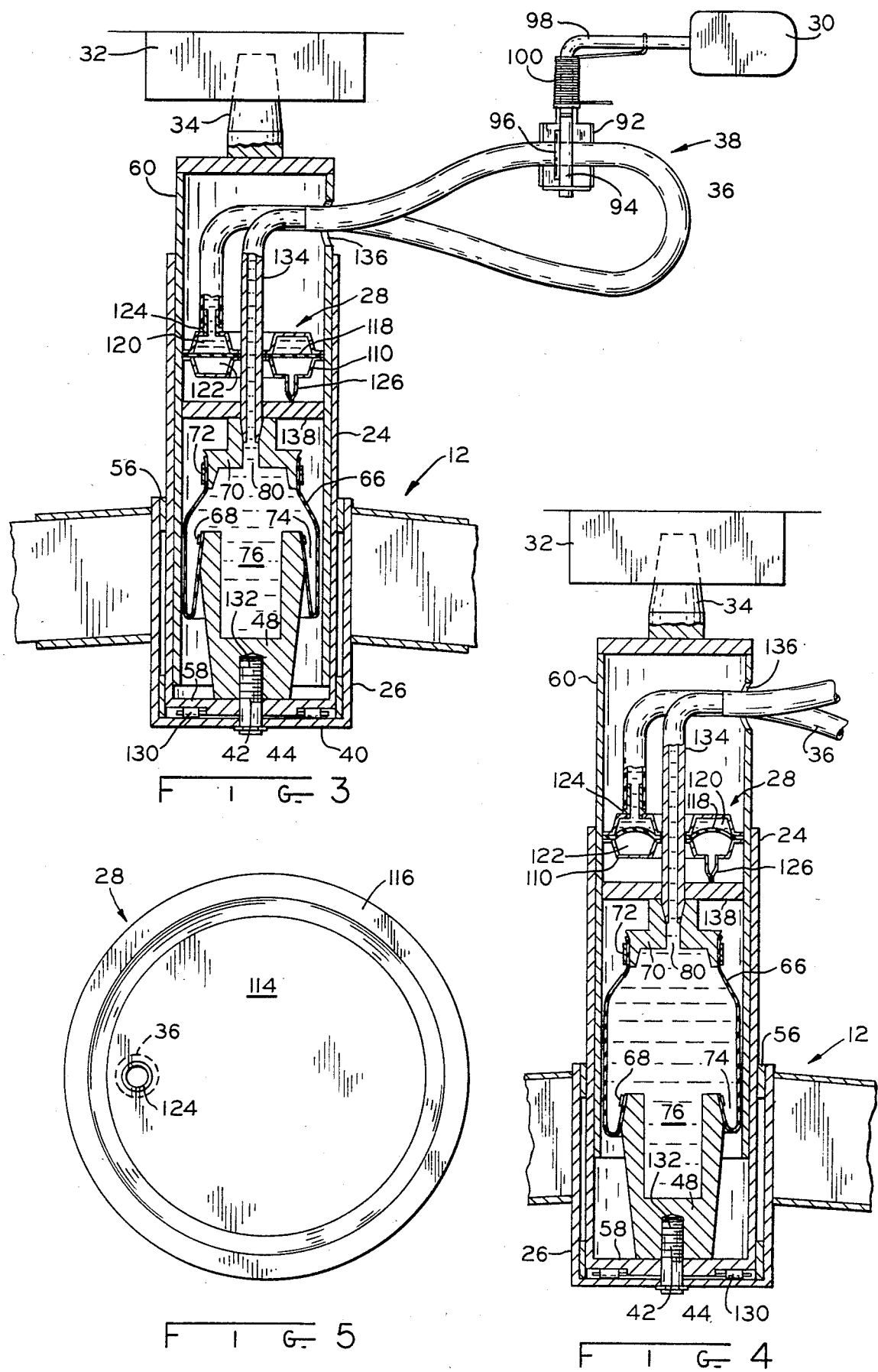

HYDRAULIC LIFTING MECHANISM FOR A CHAIR OR THE LIKE USING A TWO PHASE WORKING FLUID

BACKGROUND OF THE INVENTION

This is a continuation in part of application Ser. No. 668,307, filed Nov. 5, 1984 which is incorporated herein by reference.

This invention relates to a hydraulic lifting mechanism for an article of furniture such as a chair wherein a hydraulic power unit is provided for raising and lowering a retractable support member for supporting a chair seat or the like and which includes a reservoir containing a two phase working fluid.

It is desirable in certain articles of furniture to provide a mechanism for adjusting the height of a supporting member such as for example the height of a chair seat so that a chair occupant can select the seat height best suited for him. Prior art hydraulic mechanisms have been provided for this purpose and those mechanisms have in general included a pair of rigid walled hydraulic fluid filled chambers which communicate with each other by means of a hollow conduit. One of the chambers is expandable so as to have a variable volume and the other chamber contains a compressed gas in addition to the hydraulic liquid. The hydraulic fluid may be transferred from the pressurized chamber to the expandable chamber when a control valve located in the hollow conduit is opened. As the volume of fluid contained in the expandable chamber increases, the support member will be urged upwardly, thereby raising the chair seat. The chair seat is returned to its retracted position by transferring fluid from the variable volume chamber to the pressurized fixed volume chamber. As the variable volume chamber is compressed and the fluid is forced out of that chamber and into the pressurized fixed volume chamber, the volume of hydraulic liquid in that chamber is reduced.

One prior art patent showing the structure hereinabove described is U.S. Pat. No. 4,074,887. This patent shows two circumferentially arranged chambers with the outer chamber comprising a rigid walled sealed chamber containing hydraulic fluid and containing a pressurized gas in a top portion thereof. The inner chamber is a rigid walled expandable chamber containing only hydraulic fluid. A control lever is provided for operating a valve to enable hydraulic fluid to be transferred by means of the gas pressure from the outer chamber to the inner chamber. A piston in the expandable chamber is raised and lowered by operation of the control valve and transfer of the hydraulic fluid between the chambers.

A disadvantage of the prior art structures is that sliding seals are needed to seal the piston. Such seals are subject to wear and leakage and, as hydraulic fluid leaks out of the mechanism, the volume of hydraulic fluid in the chambers is reduced. The pressurized gas in the outer chamber will then occupy a greater volume, thereby reducing its pressure and causing the upward force and speed of the chair seat to be reduced which is undesirable. Furthermore, the lost hydraulic fluid needs to be replaced from time to time thereby requiring servicing of the mechanism. It is therefore desired to provide a hydraulic lifting mechanism wherein no sliding seals are needed and which is not subject to leakage and loss of hydraulic fluid.

Another disadvantage of the above described prior art mechanisms is that, as hydraulic liquid is transferred from the fixed volume chamber to the expandable chamber, the upward force on the chair seat and the speed thereof will be reduced. The reason for this is of course that, as the gas volume increases, the pressure decreases. It is therefore desired to provide a hydraulic lifting mechanism wherein the gas pressure is relatively constant so that the upward force on the chair seat and the speed of travel of the chair seat remain constant throughout the adjustment range of the chair seat.

A further disadvantage of the prior art mechanisms has been that the size of the fixed volume chamber needs to be relatively large in order to be able to contain a sufficient amount of pressurized gas to cause the hydraulic the variable volume chamber. It is therefore desired to provide a hydraulic mechanism for performing the lifting functions of a support surface in an article of furniture wherein the size of the fixed volume chamber is relatively small.

A still further disadvantage of the prior art structures has been that the controls for adjusting the lifting mechanisms have been located adjacent to the mechanism. These prior art arrangements have necessitated the occupant of the chair to lean over and reach far under the chair seat or have necessitated long control linkages for operating the control valves. It is therefore desired to provide a hydraulic lifting mechanism wherein the control valve can be located in a convenient location in either the chair arm or adjacent the chair seat so that it is easily operable by a chair occupant.

A yet further disadvantage of the prior art structures has been the provision of complicated valves to control the transfer of hydraulic fluid between the chambers. It is therefore desired to provide a hydraulic mechanism including a control valve which is simple yet reliable and effective.

In some of the prior art lifting mechanisms only a gas rather than an incompressible hydraulic liquid has been used to provide the lifting functions of the mechanism. These types of mechanisms are subject to leakage of gas from the mechanism and also result in spongy action of the mechanism since the gas is compressible. It is desired to provide a very positive hydraulic lifting mechanism wherein the hydraulic working fluid is incompressible.

In still other prior art mechanisms manual or electric pumps have been provided to pump the hydraulic fluid to the variable volume chamber to cause the lifting action. Such pumps are subject to failure and are also costly. It is therefore desired to provide a mechanism wherein no pumps are needed to transfer hydraulic fluid between the two chambers.

SUMMARY OF THE INVENTION

The present invention, in one form thereof, overcomes the disadvantages of the above-described prior art hydraulic lifting mechanisms by providing an improved hydraulic lifting mechanism therefor.

The lifting mechanism of the present invention includes two reservoirs. The first reservoir has a variable volume and comprises a flexible bag containing an incompressible hydraulic liquid. The second reservoir has a fixed volume and is divided into two chambers by a flexible diaphragm. The first chamber includes an incompressible hydraulic liquid and communicates with the variable volume reservoir by means of a hollow conduit. The second chamber contains a two phase working fluid which is partially in the gaseous phase and partially in the liquid phase. A control valve is provided in the hollow conduit for enabling and disabling hydraulic liquid transfer between the two chambers.

The present invention, in one form thereof, includes a base, a flexible bag comprising a variable volume reservoir supported by the base and containing a hydraulic liquid. The mechanism also includes a rigid walled, fixed volume reservoir which is divided into two chambers by a flexible diaphragm. The first chamber contains hydraulic liquid. The second chamber contains compressed two phase working fluid which is partially in a liquid state and partially in a gaseous state. A hollow conduit interconnects the first chamber and the flexible bag. A control valve is provided in the hollow conduit for selectively enabling and disabling fluid transfer between the flexible bag and the first chamber. When the valve is open and no force acts downwardly on the variable volume chamber, the pressure of the gaseous working fluid will cause the diaphragm to force hydraulic liquid out of the first chamber and into the flexible bag. As the volume of hydraulic liquid in the flexible bag increases and occupies more space, the flexible bag will be forced to expand in the upward direction, thereby forcing the support platform upwardly.

An advantage of the mechanism according to the present invention is that it operates without the use of sliding seals, thereby eliminating potential leakage, reducing the need for service and extending the life of the mechanism.

Another advantage of the mechanism of the present invention is that the fixed volume reservoir is relatively small thereby permitting the reservoir to be located in any convenient location either in the base of the article of furniture or remotely therefrom and allowing the furniture designer considerable freedom in the design of the article of furniture while retaining the advantages of using a hydraulic lifting mechanism.

Still another advantage of the mechanism according to the present invention is that the rate of upward travel of the support platform is relatively constant since the vapor pressure of the gaseous working fluid is relatively constant.

A further advantage of the lifting mechanism according to the present invention is that, if some gaseous working fluid leaks out, it will be quickly replaced since a substantial amount of the working fluid is in the liquid state and a portion of the volatile liquid thereof will boil off to replace the escaped gaseous working fluid to keep the vapor pressure constant. Therefore replacement of leaked working fluid and repressurization of the system after a period of use would not normally be necessary.

Another advantage of the mechanism of the present invention is that the control valve may be located remotely from the mechanism at any desired position in the article of furniture.

A still further advantage of the hydraulic mechanism of the present invention is the simplicity of its construction.

The invention, in one form thereof, comprises a hydraulic lifting mechanism for an article of furniture including a base and a support member movable between an extended and a retracted position. A first reservoir is provided for containing a two phase working fluid and a hydraulic liquid. A second reservoir is supported by the base and also contains hydraulic liquid and further includes a flexible wall to form a variable volume reservoir. The second reservoir supports the support member for movement between the extended and retracted positions in response to variations in the variable volume. A conduit interconnects the first and second reservoirs for transferring hydraulic liquid therebetween and includes a control valve for selectively enabling liquid transfer through the conduit.

The invention, in one form thereof, further comprises a hydraulic lifting mechanism for adjustably supporting an article of furniture and includes a base, a movable support member supported by the base which can move between extended and a retracted positions. A variable volume flexible bag member is supported by the base and contains an incompressible hydraulic liquid. The support member moves in response to variations in the volume of the flexible bag member. A fixed volume reservoir is provided including first and second chambers whose volumes are variable. The first chamber contains hydraulic liquid and communicates with the bag member by means of a hollow conduit. The second chamber contains a compressed two phase working fluid which tends to decrease the volume of the first chamber to transfer hydraulic liquid therefrom to the bag member. A control valve is included in the conduit for an enabling and disabling transfer of the hydraulic liquid.

The invention, in one form thereof, still further comprises a chair height adjustment mechanism including a base, a first reservoir including a flexible wall supported on the base and containing an incompressible hydraulic liquid. A vertically movable support member is supported by the first reservoir for supporting a chair seat which is vertically movable with the support member. A second reservoir having a fixed volume is divided into first and second chambers by a flexible diaphragm. The first chamber is sealed and includes a relatively volatile compressed two phase working fluid. The second chamber contains a hydraulic liquid and communicates with the first reservoir by means of a hollow conduit so that hydraulic liquid may be transferred between the second chamber and the first reservoir. The control valve is connected in the conduit for selectively enabling fluid flow through the conduit.

It is an object of the present invention to provide a hydraulic lifting mechanism for an article of furniture wherein no sliding seals are used.

An additional object of the present invention is to provide a mechanism for hydraulically lifting a support surface in an article of furniture wherein a flexible diaphragm member is used to form one of the working chambers.

It is a further object of the present invention to provide a mechanism for hydraulically lifting a support surface in an article of furniture wherein the control may be located remotely from the base of the article of furniture.

A yet further object of the present invention is to provide a hydraulic lifting mechanism for an article of furniture wherein a two phase working fluid is used.

A yet other object of the present invention is to provide a hydraulic lifting mechanism wherein the fixed volume reservoir is small.

Still another object of the present invention is to provide a hydraulic lifting mechanism for an article of furniture wherein the rigid walled reservoir is divided into two chambers by a flexible diaphragm.

A still further object of the present invention is to provide a hydraulic lifting mechanism wherein the upward velocity of the hydraulically operated support surface is relatively constant.

Another object of the present invention is provide a hydraulic mechanism for adjusting the height of a chair seat wherein a rigid walled reservoir is located remotely from the mechanism.

It is yet another object of the present invention to provide a hydraulic lifting mechanism for an article of furniture which is simple in construction and reliable.

BRIEF DESCRIPTION OF THE DRAWINGS

The above mentioned and other features and objects of this invention and the manner of obtaining them will become more apparent and the invention itself will be better understood by reference to the following description of an embodiment of the invention taken in conjunction with the accompanying drawings, wherein:

FIG. 1 is a perspective view of a chair incorporating a preferred embodiment of the present invention;

FIG. 2 is a sectional view of the hydraulic lifting mechanism of FIG. 1 taken along line 2—2 thereof;

FIG. 3 is a sectional view of an embodiment of the present invention wherein the two reservoirs are disposed in stacked relationship;

FIG. 4 is a sectional view of the embodiment of FIG. 3 with the variable volume reservoir in its expanded position;

FIG. 5 is a sectional view of the rigid walled reservoir of FIG. 2 taken along line 5—5 thereof.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Referring to FIG. 1 a chair 10 is shown comprising a base 12 including leg straps 13 and casters 14. A seat 16 is supported on base 12 and has connected thereto a back 18 and a pair of arms 20. A height adjustment mechanism 22 is supported by base 12 and in turn supports seat 16 by means of support platform 32. The height adjustment mechanism includes upper and lower shrouds 24 and 26, respectively, which are preferably cylindrical in shape. A rigid walled reservoir 28 is secured to the bottom of seat 16 and serves as a fixed volume chamber for the height adjustment mechanism. While in the preferred embodiment fixed volume reservoir 28 is secured to the bottom of seat 16, it may be readily understood that reservoir 28 may be located in any suitable and convenient location. Thus, for instance, if chair arms 20 were solid, reservoir 28 could be located in one of the arms of the chair. Similarly reservoir 28 may be located inside shroud 24 as will be further disclosed hereinafter. Referring further to FIG. 1 a reciprocable shaft 34 connects support platform 32 with height adjustment mechanism 22. A flexible hollow conduit 36 is provided for transferring hydraulic fluid and for cooperating with a valve mechanism 38 including a lever 30 for adjusting the height of the chair seat.

Referring now to FIG. 2, shroud 26 of height adjustment mechanism 22 includes a bottom 40 for supporting a spindle 42 which is secured to a bottom 58 of upper shroud 24 by means of a nut 44. Stationary spindle 42 supports a bearing ball 46 for rotatably supporting a support member 48. Spindle 42 is received in aperture 52 of support member 48 and further includes a recessed portion 54 for receiving locating cross pins 50 so that support member 48 is firmly secured to and laterally supported by spindle 42 and cannot be withdrawn therefrom. Spacers 56 are provided between lower shroud 26 and upper shroud 24. Upper spacer 56 includes flange 57 and lower spacer 56 includes flange 40. An air space 59 permits deformation of lower shroud 26 by leg straps 13 without causing interference with the free rotation of upper shroud 24. An inner support tube 60 including a bottom 62 is provided for laterally supporting a flexible bag 66. Bottom 62 is the "up" stop and will limit the upward travel of the chair by bottoming out against bottom 49 of support member 48 when the chair is lifted to its upper position. Inner support tube 60 is spaced from upper shroud 24 by means of a sleeve bearing 64, so that inner support tube 60 can move rotatably and axially telescopically with respect to upper shroud 24. Flexible bag 66 is sealingly secured to support member 48 by means of a retaining ring 68. Flexible bag 66 is also sealingly secured to a plug 70 by means of a retaining ring 72. Thus flexible bag 66 forms a sealed variable volume 74 for containing hydraulic fluid 76.

It can therefore be seen that, as support tube 60 telescopes upwardly, volume 74 of flexible bag 72 will increase so that flexible bag 66 can contain more hydraulic fluid 76. Conversely as the sides of bag 66 roll in upon themselves in the manner of a rolling sock, volume 74 is reduced and the amount of hydraulic fluid 76 which is contained in volume 74 is decreased. Flexible bag 66 is supported from lateral outward movement by inner support tube 60.

Thus when an incompressible hydraulic fluid 76 is added to the volume in flexible bag 66, the expansion of volume 74 must take place in the upward direction. As volume 74 expands in the upward direction the upward lifting force on support shaft 34 and platform 32 will lift chair seat 16. Similarly when a downward force acts on platform 32 and is transmitted by shaft 34 to bag 66, hydraulic fluid will be forced out of bag 66 to return to fixed volume chamber 28 thereby allowing seat 16 to descend, as further explained hereinafter.

The flexible diaphragm comprising the wall of bag 66 may be manufactured of any suitable material such as for instance neoprene rubber. The flexible diaphragm must be stiff enough to be able to perform the supporting and lifting functions and yet flexible enough to be able to roll in upon itself as shown. The advantage of using the flexible bag or rolling sock is to provide a variable volume chamber without the need for sliding seals as was required by the prior art structures as described hereinabove.

With further reference to FIG. 2 it can be seen that an aperture 80 is provided in plug 70 for hydraulic liquid to enter and exit from volume 74. A threaded fitting 84 is provided for engagement with a threaded aperture in plug 70 and top support member 82. Top support member 82 also includes a hose adapter 86 for connecting with a flexible hollow conduit or hose 36.

A control valve assembly 38 is used in connection with flexible conduit 36 to control the flow of hydraulic liquid through conduit 36. A more complete description of control valve assembly 38 is provided in U.S. patent application Ser. No. 773,337 entitled Height Control Mechanism, filed on even date herewith and assigned to the same assignee as the present invention and incorporated herein by reference.

Continuing now with FIG. 2 the control valve assembly 38 includes a valve body 92 and a rotating rod 94 including a bent portion 98 which is secured to operating lever 30. Rod 94 has secured thereto a cam member 96 which rotates in unison with rod 94 as lever 30 is operated. In its normal position cam member 96 pinches flexible conduit 36 against valve body 92 to thereby shut off the flow of hydraulic liquid through conduit 36. A spring 100 is provided to normally bias cam 96 into its conduit closing position. When lever 30 is operated against the urging force of bias spring 100, conduit 36 will be opened to permit transfer of fluid between fixed volume reservoir 28 and flexible bag 66.

Referring further to FIGS. 2 and 5 fixed volume reservoir 28 includes a cylindrical housing 110 including upper and lower shells 112 and 114, respectively, which are secured to each other by means of flanges 116. Reservoir 28 also includes a flexible, generally circular, diaphragm 118 which is captured between flanges 116 for retention therebetween. Flanges 116 may be secured in any manner such as for instance by welding, threaded fasteners, crimping or the like. Diaphragm 118 divides the space enclosed by housing 110 of reservoir 28 to form upper and lower chambers 120 and 122, respectively. Upper reservoir 120 contains a pressurized two phase working fluid. A fill tube 126 is provided for filling upper chamber 120 with working fluid. Lower chamber 122 contains incompressible hydraulic liquid. Lower chamber 122 is also provided with a hose fitting for receiving one end of hollow conduit 36.

The compressed two phase working fluid in chamber 120 is partially in the liquid state and partially in the gaseous state. Various working fluids may be used, however the working fluid should have two phases namely a liquid and gaseous phase, and should exist in these two phases at room temperature and a pressure in the range of approximately 20 psi to 150 psi. The working fluid should be relatively volatile so that it will boil off readily from the liquid phase to the gaseous phase. One such working fluid which has been found to work satisfactorily is refrigerant. Several different types of refrigerant may be used such as for instance Freon or a mixture of Diethylene and Freon. The pressure at which the refrigerant exists in its liquid phase at normal room temperature of approximately 70° F. is in the range of 60 psi to 70 psi. It should be understood that any working fluid having two phases at room temperature and the indicated pressure ranges is acceptable.

When control valve mechanism 38 is opened to permit transfer of hydraulic liquid between bag 66 and chamber 122 the refrigerant pressure in chamber 120 will cause flexible diaphragm 118 to bow downwardly and force hydraulic liquid into flexible bag 66, thereby causing chair seat 16 to be raised. The normal length of travel of chair seat 16 is approximately 2½ to 6 inches. Since one half cubic inch of Freon will displace 20 cubic inches of water at constant pressure, if Freon were used as the working fluid chamber 120 will need to have a capacity in the range of 25 to 40 cubic inches. Diaphragm 118 may be manufactured to be either smooth or corrugated.

Thus in the operation of the system, when control valve mechanism 38 is operated to open tube 36 and enable transfer of hydraulic liquid and when chair seat 16 is unoccupied, the pressure in chamber 120 will cause diaphragm 118 to flex downwardly thereby forcing hydraulic liquid out of chamber 122 through conduit 36 and into variable volume 74 thereby causing chair seat 16 to rise. On the other hand if a person occupies chair seat 16 and valve 38 is opened hydraulic liquid will be forced through conduit 36 into chamber 122. The vapor pressure in chamber 120 will remain relatively constant as the two phase working fluid will boil off into its gaseous phase as chamber 120 expands. By the same token when chamber 120 contracts gaseous working fluid will be transformed into liquid working fluid. If any gaseous working fluid escapes from chamber 120 it will be replaced by more liquid working fluid boiling off into gaseous working fluid. By the advantageous use of a volatile two phase working fluid which changes from the liquid phase to the gaseous phase, a relatively constant pressure is provided in chamber 120 regardless of the position of the chair seat. The constant gas pressure will cause the upward force on seat 16 and the velocity thereof to be constant throughout its length of travel.

Referring now to FIGS. 3 and 4 an alternate embodiment of the invention is shown wherein the two reservoirs 66 and 28 are shown in stacked relationship. Additionally an alternate arrangement is shown for spindle 42 whereby the spindle has a threaded upper portion 132 and is secured to support member 48 by threaded engagement with a threaded aperture therein. A thrust bearing 130 is provided for rotatably supporting bottom 58 of upper shroud 24. Thus in this embodiment spindle 42 rotates together with support member 48 and upper shroud 24. Furthermore, a tube 134 is provided for connecting conduit 36 with plug 70. An aperture 136 is provided in inner support tube 60 to permit tube 36 to pass through the sidewall thereof. Divider wall 138 is also provided between the lower portion of inner support tube 60 which houses flexible bag 66 and the upper portion of inner tube 60 which houses reservoir 28.

By reference to FIG. 4 the mechanism is seen to be in its extended position wherein tube 60 is moved upwardly and wherein diaphragm 118 is bowed upwardly under the operation of refrigerant pressure in chamber 122. Hydraulic liquid has been forced out of chamber 120 through conduit 136 into flexible bag 66 so that bag 66 has been extended upwardly to enclose a larger volume 74 than in FIG. 3 thereby forcing support platform 32 upward.

It can be readily appreciated that control valve assembly 38 may be located in any convenient position in the article of furniture. Thus, as seen in FIG. 1, the control may be located adjacent the chair seat where it is easily accessible to a chair occupant. Alternatively it could be located in the chair arm or in case of the use of the hydraulic lifting mechanism with a table, the control may be located below the table top. Since conduit 36 is flexible and since reservoir 28 is small the furniture designer will have great freedom to locate the control and fixed volume reservoir.

While this invention has been described as having a preferred design it will be understood that it is capable of further modification. This application is therefore intended to cover any variations, uses, or adaptations of the invention following the general principles thereof and including such departures from the present disclosure has come within known or customary practice in the art to which this invention pertains and fall within the limits of the appended claims.

What is claimed is:

1. A hydraulic lift mechanism for an article of furniture comprising:
   a base;
   a support member moveable between extended and retracted positions;
   a first reservoir containing a two phase working fluid and a hydraulic liquid;
   a second reservoir supported by said base and containing hydraulic liquid, said second reservoir including a flexible wall and having a variable volume, said second reservoir supporting said support member for movement between said extended and retracted positions in response to variations in said variable volume;
   conduit means for connecting said first reservoir to said second reservoir to transfer hydraulic liquid therebetween; and
   control valve means operatively connected in said conduit means for selectively enabling fluid transfer through said conduit.

2. The mechanism of claim 1 wherein said first reservoir includes a dividing wall means for dividing said reservoir into two chambers, the first of said chambers containing said hydraulic liquid and the second of said chambers containing said two phase working fluid.

3. The mechanism according to claim 1 wherein at least a part of said working fluid is in the liquid state.

4. The mechanism of claim 1 wherein part of said working fluid is in the liquid state and part of said working fluid is in the gaseous state, the vapor pressure of said gaseous working fluid being substantially constant for all positions of said support member.

5. The mechanism of claim 2 wherein said dividing wall means comprises a flexible diaphragm.

6. The mechanism of claim 2 wherein said wall means comprises a flexible rubber diaphragm.

7. The mechanism of claim 1 wherein said first reservoir is positioned remotely from said base and said second reservoir.

8. The mechanism of claim 1 wherein said article of furniture comprises a chair and wherein said first reservoir is secured to the seat of said chair.

9. The mechanism of claim 1 wherein said conduit means is flexible and wherein said control valve means comprises a valve including a cam operable by a lever for selectively pinching off and closing said flexible conduit to prevent liquid flow therethrough.

10. A hydraulic lifting mechanism for an article of furniture comprising:
    a base;
    a support member supported by said base and movable between an extended and a retracted position;
    a variable volume flexible bag member containing an incompressible hydraulic liquid supported by said base, said support member moving in response to variations in said volume;
    a fixed volume reservoir including first and second chambers, the respective volumes of said chambers being variable, said first chamber containing hydraulic liquid and connected to said bag member by a hollow conduit;
    said second chamber containing a compressed two phase working fluid, said compressed working fluid tending to decrease the volume of said first chamber to transfer hydraulic liquid therefrom to said bag member; and
    control valve means in said conduit for enabling and disabling transfer of said hydraulic liquid.

11. The mechanism of claim 10 wherein said first and second chambers are divided by a flexible diaphragm.

12. The mechanism of claim 10 wherein said chambers are divided by a flexible rubber diaphragm.

13. The mechanism of claim 10 wherein said working fluid is a refrigerant.

14. The mechanism of claim 10 wherein said working fluid is Freon.

15. The mechanism of claim 10 wherein said article of furniture comprises a chair and wherein said fixed volume reservoir is secured to the bottom of the seat of said chair.

16. The mechanism of claim 10 wherein said conduit means is flexible and wherein said control valve means includes a cam member operable by a lever for selectively pinching and closing said flexible conduit to prevent fluid flow therethrough.

17. A chair height adjustment mechanism comprising:
    a base member;
    a first reservoir supported on said base, said reservoir including a flexible wall member and containing an incompressible hydraulic liquid;
    a vertically movable support member supported by said first reservoir;
    a chair seat supported on said support member and vertically movable therewith;
    a second reservoir having a fixed volume and divided into first and second chambers by a flexible diaphragm, said first chamber being sealed and including a compressed two phase working fluid, said second chamber containing said hydraulic liquid;
    a hollow conduit means interconnecting said second chamber and said first reservoir for transfer of liquid therebetween; and
    control valve means connected in said conduit means for selectively enabling liquid flow through said conduit.

18. The mechanism of claim 17 wherein at least a part of said working fluid is in the liquid state.

19. The mechanism of claim 17 wherein a part of said working fluid is in the liquid state and the remainder of said working fluid is in the gaseous state, the vapor pressure of said gaseous working fluid being substantially constant for all positions of said support member.

20. The mechanism according to claim 17 wherein said flexible diaphragm is comprised of rubber.

21. The mechanism according to claim 17 wherein said second volume reservoir is positioned remotely from said base and said first reservoir.

22. The mechanism according to claim 17 wherein said hollow conduit means is flexible and wherein said control valve means includes a rotatable cam member operable by a lever for selectively pinching off and closing said flexible conduit to prevent liquid flow therethrough.

23. The mechanism of claim 22 and including a spring bias means for biasing said cam member into said conduit closing position said lever being selectively operable against the urging bias force of said spring member to open said conduit and to permit selective adjustment of the chair height.

24. The mechanism of claim 16 wherein said working fluid is refrigerant.

25. The mechanism of claim 24 wherein said working fluid is freon.

* * * * *

UNITED STATES PATENT AND TRADEMARK OFFICE
CERTIFICATE OF CORRECTION

PATENT NO. : 4,592,590

DATED : June 3, 1986

INVENTOR(S) : Mathew A. Slaats et al

It is certified that error appears in the above-identified patent and that said Letters Patent is hereby corrected as shown below:

Col. 2, lines 15-16, after "hydraulic" insert --fluid to be transferred from the fixed volume chamber to--

Signed and Sealed this

Twenty-sixth Day of August 1986

[SEAL]

Attest:

DONALD J. QUIGG

*Attesting Officer*  *Commissioner of Patents and Trademarks*